(12) United States Patent
Gole et al.

(10) Patent No.: US 12,533,115 B2
(45) Date of Patent: Jan. 27, 2026

(54) MEDICAL DELIVERY DEVICES, ASSEMBLIES, AND RELATED METHODS

(71) Applicant: BOSTON SCIENTIFIC MEDICAL DEVICE LIMITED, Galway (IE)

(72) Inventors: Nachiket Gole, Pune (IN); Deepak Kumar Sharma, Muzaffarnagar (IN); Rajivkumar Singh, Thane (IN); Sharath Kumar G, Kanakapura (IN)

(73) Assignee: BOSTON SCIENTIFIC MEDICAL DEVICE LIMITED, Galway (IE)

( * ) Notice: Subject to any disclaimer, the term of this patent is extended or adjusted under 35 U.S.C. 154(b) by 302 days.

(21) Appl. No.: 18/488,126

(22) Filed: Oct. 17, 2023

(65) Prior Publication Data
US 2024/0130721 A1    Apr. 25, 2024
US 2024/0225628 A9    Jul. 11, 2024

Related U.S. Application Data

(60) Provisional application No. 63/418,706, filed on Oct. 24, 2022.

(51) Int. Cl.
*A61B 17/00*    (2006.01)

(52) U.S. Cl.
CPC .. *A61B 17/00491* (2013.01); *A61B 17/00234* (2013.01); *A61B 2017/00238* (2013.01);
(Continued)

(58) Field of Classification Search
CPC ........ A61B 17/00234; A61B 17/00491; A61B 2017/00238; A61B 2017/00296;
(Continued)

(56) References Cited

U.S. PATENT DOCUMENTS 8,709,039 B2 *  4/2014  Humphreys .......... A61M 39/06
                                                     606/108
2011/0282324 A1  11/2011  Kurokawa et al.

FOREIGN PATENT DOCUMENTS

DE    212018000416 U1    1/2021
WO    2011011372 A2      1/2011

OTHER PUBLICATIONS

International Search Report and Written Opinion in International Application No. PCT/IB2023/060469, dated Jan. 23, 2024 (11 pages).

* cited by examiner

*Primary Examiner* — Mohamed G Gabr
(74) *Attorney, Agent, or Firm* — Bookoff McAndrews PLLC

(57) ABSTRACT

An assembly of a medical delivery device includes an inner sleeve including a flange at a proximal end. The flange includes one or more through holes. The assembly also includes an outer sleeve movably coupled to the inner sleeve. A distal tip of the outer sleeve includes a plurality of openings for delivering an adhesive to a treatment site. The assembly further includes a cavity formed between the inner sleeve and the outer sleeve and configured to hold the adhesive prior to the delivering. The assembly yet further includes one or more actuators connected to a proximal end of the outer sleeve and extended via the one or more through holes to a handle of the medical delivery device. Actuation of the one or more actuators moves one of the inner sleeve or the outer sleeve relative to the other to cause the delivering of the adhesive.

20 Claims, 4 Drawing Sheets

(52) U.S. Cl.
CPC ............... *A61B 2017/00367* (2013.01); *A61B 2017/0046* (2013.01); *A61B 2017/00495* (2013.01); *A61B 2017/00681* (2013.01); *A61B 2017/00818* (2013.01); *A61B 2017/00991* (2013.01); *A61B 2560/02* (2013.01); *A61B 2560/04* (2013.01)

(58) Field of Classification Search
CPC .. A61B 2017/00367; A61B 2017/0046; A61B 2017/00495; A61B 2017/00681; A61B 2017/00818; A61B 2017/00991; A61B 2560/02; A61B 2560/04
See application file for complete search history.

MEDICAL DELIVERY DEVICES, ASSEMBLIES, AND RELATED METHODS

CROSS-REFERENCE TO RELATED APPLICATIONS

This application claims the benefit of priority from U.S. Provisional Application No. 63/418,706, filed Oct. 24, 2022, which is incorporated by reference herein in its entirety.

TECHNICAL FIELD

The disclosure relates generally to medical delivery devices. More specifically, aspects of the disclosure pertain to medical delivery devices and assemblies thereof for mounting to medical devices to deliver adhesive to a treatment site.

BACKGROUND

Bleeding in the gastrointestinal (GI) tract is often challenging to control, as it can be difficult to access a site of the bleeding. One exemplary treatment method to control bleeding in the GI tract includes application of a hemostatic device, such as a patch or mesh, to the site. For example, the patch or mesh may be deployed to the site using an endoscope, and a liquid or semi-liquid adhesive may be applied to secure the patch or the mesh to the site until at least clots are formed to stop the bleeding. Currently, the adhesive may be delivered through an injection needle that is delivered distally through a working channel of the endoscope to reach the site. However, the injection needle is limited to delivering the adhesive at a single point or location, and occupies a working channel of the endoscope. Therefore, the injection needle may have to be repeatedly repositioned and actuated to deliver the adhesive to multiple points or location throughout the site to help ensure the patch or the mesh is sufficiently secured to the site, which may increase an overall procedure time.

SUMMARY

An assembly of a medical delivery device may include an inner sleeve including a flange at a proximal end. The flange may include one or more through holes. The assembly may also include an outer sleeve movably coupled to the inner sleeve. A distal tip of the outer sleeve may include a plurality of openings for delivering an adhesive to a treatment site. The assembly may further include a cavity formed between the inner sleeve and the outer sleeve and configured to hold the adhesive prior to the delivering. The assembly may yet further include one or more actuators connected to a proximal end of the outer sleeve and extended via the one or more through holes to a handle of the medical delivery device. Actuation of the one or more actuators may move one of the inner sleeve or the outer sleeve relative to the other to cause the delivering of the adhesive.

In any of the exemplary assemblies disclosed herein, the distal tip of the outer sleeve may further comprise a plurality of distally extending protrusions positioned between at least some of the plurality of openings. The assembly may also include a first gasket positioned at a distal contact point of the inner sleeve and the outer sleeve that extends to the distal tip of the outer sleeve. The first gasket may include a plurality of flaps corresponding to and covering the plurality of openings at the distal tip. The inner sleeve may include a groove, and the assembly may also include a second gasket positioned at a proximal contact point of the inner sleeve and the outer sleeve within the groove. The assembly may also include one or more outer tubes coupled to the flange and enclosing the one or more actuators from a proximal surface of the flange to the handle.

In some aspects, the assembly may be a first assembly of a two-part assembly of the medical delivery device for delivering a first component of the adhesive. The first assembly may be connected to a second assembly of the two-part assembly that is for delivering a second component of the adhesive to be mixed with the first component at the treatment site. The first assembly may be coupled to a first actuation component of an actuation mechanism disposed on or within the handle. The second assembly may be coupled to a second actuation component of the actuation mechanism. The first actuation component and the second actuation component may be independently actuable to cause independent operation of the first assembly and the second assembly.

In other aspects, the inner sleeve may be a telescoping sleeve, and the cavity formed between the inner sleeve and the outer sleeve is a first cavity configured to hold a first component of the adhesive. The telescoping sleeve may include an inner telescoping sleeve, and an outer telescoping sleeve movably coupled to the inner telescoping sleeve. The assembly may include a second cavity formed between the inner telescoping sleeve and the outer telescoping sleeve and configured to hold a second component of the adhesive to be mixed with the first component prior to the delivering of the adhesive to the treatment site. The outer telescoping sleeve may include one or more valves to allow for flow of the second component of the adhesive from the second cavity to the first cavity. The assembly may further include a first gasket positioned at a distal contact point of the outer telescoping sleeve and the outer sleeve, a second gasket positioned at a proximal contact point of the outer telescoping sleeve and the outer sleeve, a third gasket positioned at a distal contact point of the inner telescoping sleeve and the outer telescoping sleeve, and a fourth gasket positioned at a proximal contact point of the inner telescoping sleeve and the outer telescoping sleeve.

In further aspects, the inner sleeve may include a step configured to receive a distal tip of the medical device to mount the assembly to the medical device. A configuration of the assembly may prevent obstruction of components at the distal tip of the medical device when the assembly is mounted to the medical device. The components may include at least one of distal openings of one or more working channels, one or more illumination devices, or visualization devices. The proximal end of the outer sleeve may include one or more slots, and the one or more actuators may be coupled to the proximal end of the outer sleeve via the one or more slots.

In other examples, an assembly of a medical delivery device may include an inner sleeve including a flange at a proximal end. The flange may include one or more through holes. The assembly may also include an outer sleeve movably coupled to the inner sleeve. A distal tip of the outer sleeve may include a plurality of openings for delivering an adhesive to a treatment site. The assembly may further include a cavity formed between the inner sleeve and the outer sleeve and configured to hold the adhesive prior to the delivering. The assembly may yet further include a gasket positioned at a distal contact point of the inner sleeve and the outer sleeve that extends to the distal tip of the outer sleeve and includes a plurality of flaps corresponding to and covering the plurality of openings at the distal tip. The assembly may also include one or more actuators connected to a proximal end of the outer sleeve and extended via the one or more through holes to a handle of the medical delivery device. Actuation of the one or more actuators may move one of the inner sleeve or the outer sleeve relative to the other to pressurize the adhesive in the cavity causing the plurality of flaps to be forced open and the adhesive to be delivered via the plurality of openings.

Any of the exemplary disclosed herein may include any of the following features. The distal tip of the outer sleeve may further comprise a plurality of distally extending protrusions positioned between at least some of the plurality of openings. One or more outer tubes may be coupled to the flange and enclose the one or more actuators from a proximal surface of the flange to the handle.

In further examples, a medical delivery device may include a handle including one or more actuation mechanisms, and one or more assemblies mountable to the medical device. Each of the one or more assemblies may include an inner sleeve including a flange at a proximal end. The flange may include one or more through holes. Each of the assemblies may also include an outer sleeve movably coupled to the inner sleeve. A distal tip of the outer sleeve may include a plurality of openings for delivering adhesive to a treatment site. Each of the assemblies may further include a cavity formed between the inner sleeve and the outer sleeve and configured to hold the adhesive prior to the delivering. Each of the assemblies may yet further include one or more actuators connected to a proximal end of the outer sleeve and extended via the one or more through holes to the handle of the medical delivery device. Actuation of the one or more actuators via the one or more actuation mechanisms may move one of the inner sleeve or the outer sleeve relative to the other to cause the delivering of the adhesive.

In any of the exemplary assemblies disclosed herein, the assemblies may include a first assembly for delivering a first component of the adhesive and a second assembly for delivering a second component of the adhesive to be mixed with the first component at the treatment site.

It may be understood that both the foregoing general description and the following detailed description are exemplary and explanatory only and are not restrictive of the invention, as claimed. As used herein, the terms "comprises," "comprising," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." The term "distal" refers to a direction away from an operator/toward a treatment site, and the term "proximal" refers to a direction toward an operator. The term "approximately," or like terms (e.g., "substantially"), includes values+/−10% of a stated value.

BRIEF DESCRIPTION OF THE DRAWINGS

The accompanying drawings, which are incorporated in and constitute a part of this specification, illustrate examples of this disclosure and together with the description, serve to explain the principles of the disclosure.

DETAILED DESCRIPTION

Figure 1A:
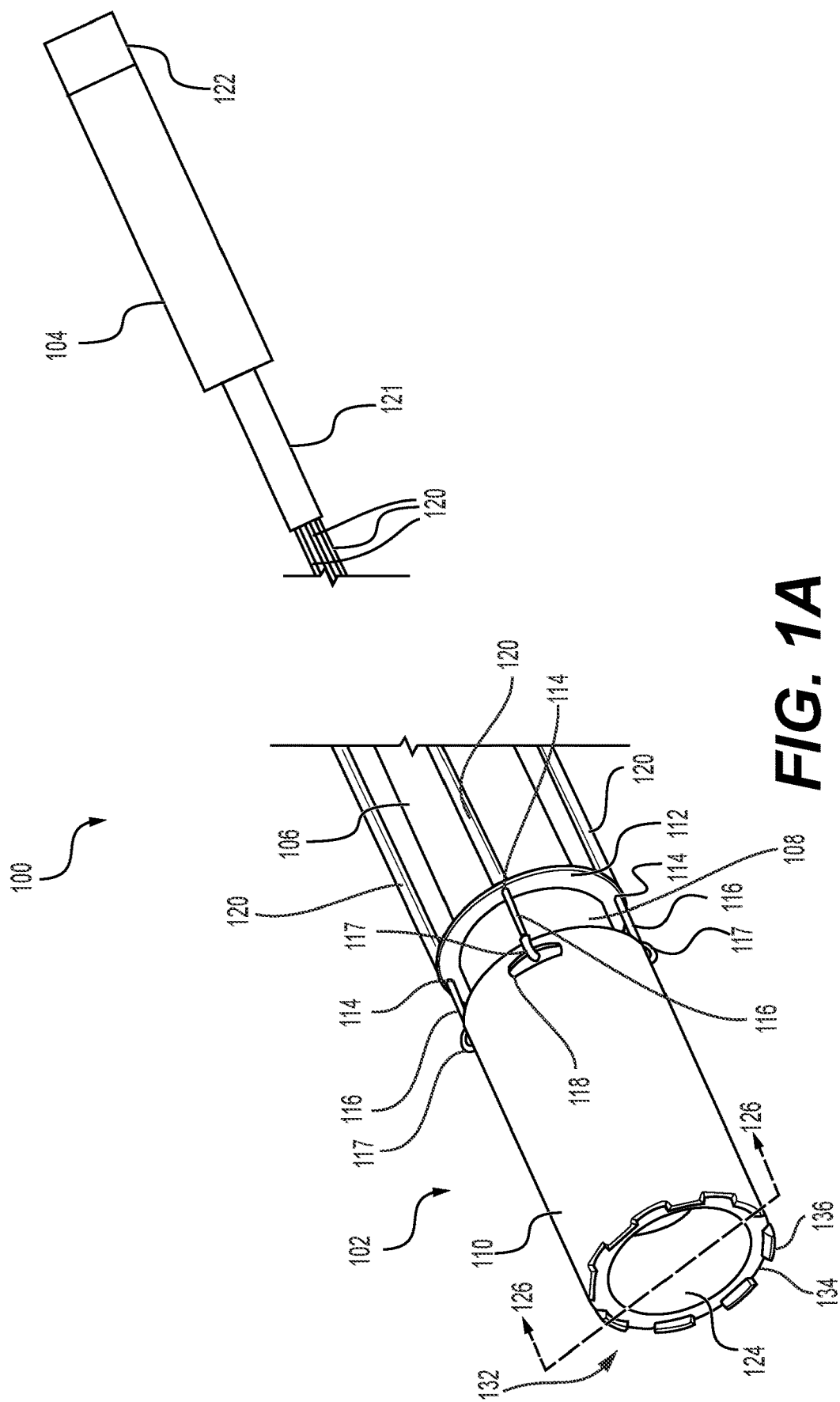
FIGS. 1A-1C depict various views of an exemplary medical delivery device that includes a first assembly configuration.

Bleeding in the GI tract may be caused by peptic ulcers or other similar sores that develop on the lining of the stomach and/or the upper portion of the small intestine of the GI tract. The ulcers may develop due to stomach acid from bacteria or use of anti-inflammatory drugs, for example, that damage the lining. Internal bleeding is a common complication of these types of ulcers, particularly when the ulcer develops at a site of a blood vessel. If left untreated, the ulcer may swell or scar, which may create a blockage in the GI tract. Additionally or alternatively, the ulcer may perforate the stomach or small intestine and infect the abdomen, causing peritonitis. A bleeding ulcer in the GI tract may lead to anemia, bloody vomit, and/or bloody stools.

As briefly mentioned above, bleeding in the GI tract is often challenging to control as it can be difficult to access a site of the bleeding. Current treatment methods for stopping or reducing bleeding in the GI tract include injection therapy, thermal therapy, and mechanical therapy, which are time intensive, cost intensive, and highly localized treatments. One exemplary mechanical treatment method includes application of a hemostatic device, such as a patch or mesh to the site. For example, the patch or mesh may be deployed to the site using an endoscope, and a liquid or semi-liquid adhesive may be applied to secure the patch or the mesh to the site until at least clots are formed to stop the bleeding. Conventionally, the adhesive may be delivered through an injection needle that is delivered distally through a working channel of the endoscope to reach the site. However, the injection needle is limited to delivering the adhesive at a single point or location. Resultantly, the injection needle may have to be repeatedly repositioned and actuated to deliver the adhesive to multiple points or locations throughout the site to help ensure that the patch or the mesh is sufficiently secured to the site, which may increase an overall procedure time.

Therefore, aspects of this disclosure are directed to medical delivery devices, assemblies thereof, and related methods for distributed delivery of an adhesive to a treatment site. An exemplary medical delivery device may include an assembly that is mountable or otherwise couplable to a distal tip of a medical device and is configured to deliver the adhesive in the distributed manner. The medical delivery device may also include a handle connected to the assembly to enable an operator to control the delivery of the adhesive by the assembly. Various configurations of the assembly of the medical delivery device may be implemented.

In one example and as described with reference to FIGS. 1A-1C below, a first assembly configuration may include an inner sleeve and an outer sleeve movably coupled to one another, where a first cavity formed between the inner and outer sleeves may be configured to hold the adhesive prior to the delivery. One or more actuators may be connected to a proximal end of the outer sleeve. The one or more actuators may be extended via one or more through holes of a flange at a proximal end of the inner sleeve to the handle of the medical delivery device. Actuation of the one or more actuators may move one of the inner sleeve or the outer sleeve relative to the other to cause the delivery of the adhesive via a plurality of openings at a distal tip of the outer sleeve.

In another example and as described with reference to FIGS. 2A and 2B below, a second assembly configuration may include a two-part assembly comprised of a first assembly and a second assembly. Each of the first and second assemblies may include the same or similar components of the first assembly configuration. However, the first assembly may be configured to deliver a first adhesive component, and the second assembly may be configured to deliver a second adhesive component that is to be mixed with the first adhesive component upon delivery to the treatment site.

In a further example and as described with reference to FIG. 3 below, a third assembly configuration may include a telescopic two-part assembly comprised of an outer sleeve and an inner sleeve forming a first cavity, where the inner sleeve may be a telescoping inner sleeve that forms a second cavity. For example, the telescoping sleeve may include an inner telescoping sleeve and an outer telescoping sleeve movably coupled to the inner telescoping sleeve, where the second cavity is formed between the inner and outer telescoping sleeves. The first cavity may be configured to hold a first adhesive component, while the second cavity may be configured to hold a second adhesive component to be mixed with the first adhesive component (e.g., within the first cavity) prior to delivery to the treatment site.

In an exemplary medical delivery device having any of the above-discussed assembly configurations, when the assembly is mounted or otherwise coupled to the distal tip of medical device, a working channel conventionally used to deliver an injection needle for adhesive delivery may be left unobstructed. Therefore, in addition to the medical delivery device causing the adhesive to be distributed over a wider surface area at the treatment site with a single delivery, the unobstructed working channel may be used to deliver other components concurrently and/or closer in time with the adhesive during a treatment procedure, which may increase efficiency and thus reduce an overall time of the procedure.

FIG. 1A depicts an exemplary medical delivery device 100. Medical delivery device 100 may include an assembly 102 having a first assembly configuration. Medical delivery device 100 may also include a handle 104 to which assembly 102 is connected. Assembly 102 may be removably mounted to a medical device 106. FIG. 1B depicts a cross-sectional view of assembly 102 taken along line 126 in FIG. 1A. FIG. 1C depicts a top view perspective of the cross-section of assembly 102 depicted in FIG. 1B. Referring concurrently to FIGS. 1A-1C, assembly 102 may include an inner sleeve 108, an outer sleeve 110, one or more actuators 116, one or more outer tubes 120, and one or more gaskets, including a first gasket 124 and a second gasket 140.

Outer sleeve 110 may be movably coupled to inner sleeve 108. For example, outer sleeve 110 may be telescopically mounted on inner sleeve 108 such that inner sleeve 108 and/or outer sleeve 110 may move or slide relative to the other between a first configuration and a second configuration, for example, for adhesive delivery. In some examples, outer sleeve 110 may move proximally toward handle 104 while inner sleeve 108 remains stationary, in order to transition from the first configuration to the second configuration. In other examples, inner sleeve 108 may move distally away from handle 104, while outer sleeve 110 remains stationary, in order to transition from the first configuration to the second configuration. In further examples, outer sleeve 110 may move proximally as inner sleeve 108 moves distally.

Figure 1C:
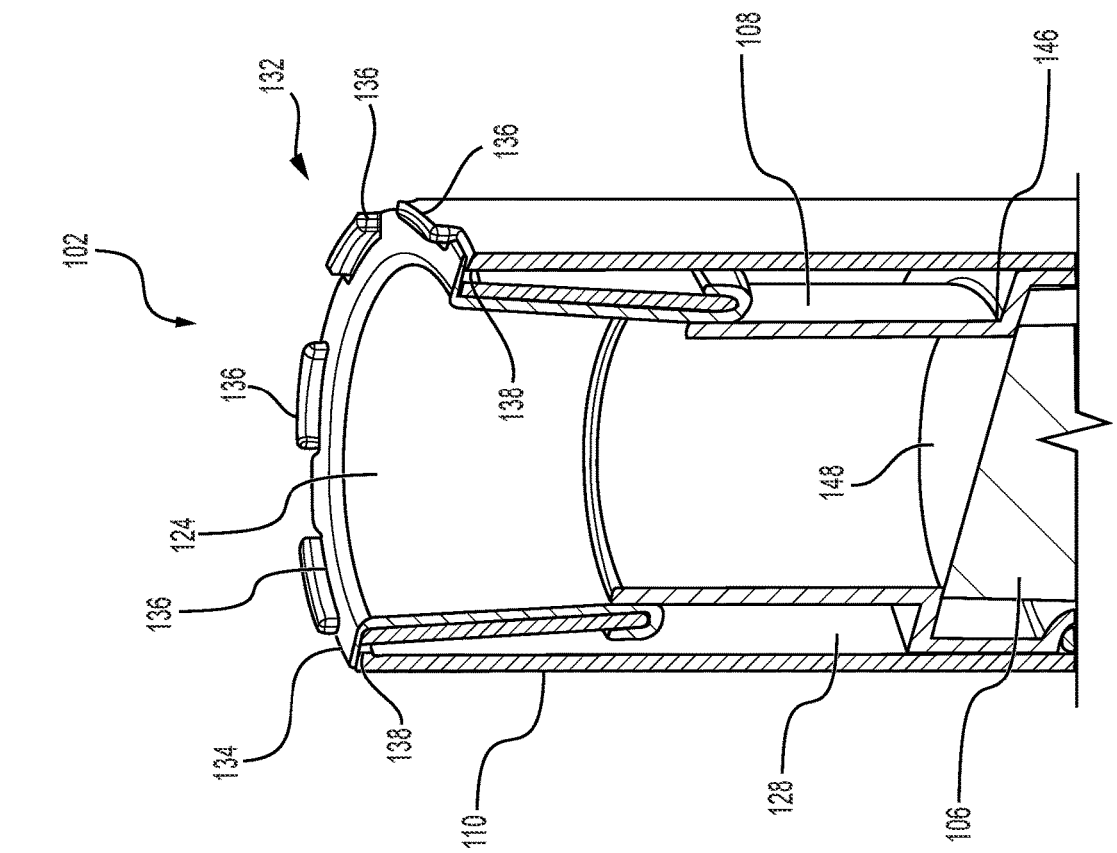
Figure 1B:
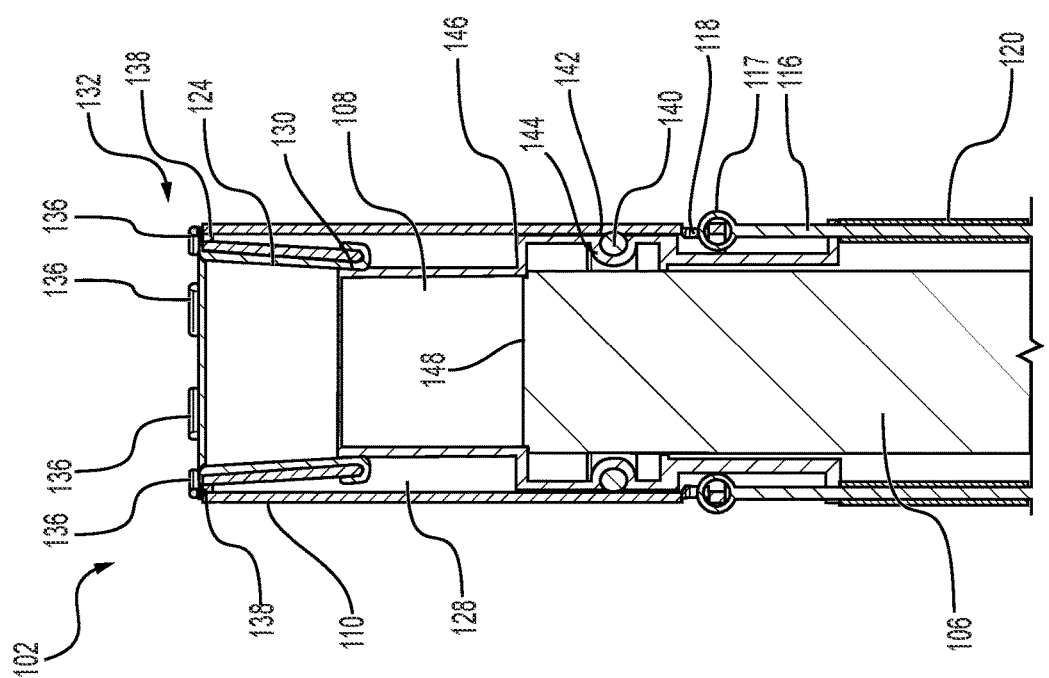

FIGS. 1A-1C depict inner sleeve 108 and outer sleeve 110 in the first configuration (e.g., prior to movement of inner sleeve 108 and/or outer sleeve 110 to transition to the second configuration). While in the first configuration, a volume between inner sleeve 108 and outer sleeve 110 may form a cavity 128 (FIGS. 1B and 1C). Cavity 128 may be configured to contain adhesive that is delivered via assembly 102 to a hemostatic device (e.g., a patch or a mesh) deployed at a treatment site. As discussed herein, the adhesive may be delivered when at least one of inner sleeve 108 or outer sleeve 110 is moved relative to the other from the first configuration to the second configuration.

Outer sleeve 110 may be a rigid, hollow cylindrical component. In some examples, outer sleeve 110 may be comprised of plastic or other biocompatible material. A proximal end of outer sleeve 110 may include slots 118 or other similar structures for connecting actuators 116 to outer sleeve 110, as described in detail below. A distal tip 132 of outer sleeve 110 may include a plurality of openings 138 (e.g., holes, slots, nozzles, or the like) spaced apart along a circumference of distal tip 132. Adhesive may be delivered from cavity 128 to the hemostatic device deployed at the treatment site via each of openings 138 when the adhesive is pressurized based on the movement of inner sleeve 108 and/or outer sleeve 110 relative to the other. Delivery of the adhesive from each of openings 138 enables the adhesive to be distributed over or contemporaneously delivered to a larger surface area of the hemostatic device or treatment site as compared to injection-based adhesive delivery that is limited to application at a single point or location.

Distal tip 132 of outer sleeve 110 may also include a plurality of protrusions 136 positioned between each of openings 138. Prior to delivery of the adhesive, assembly 102 may be positioned such that protrusions 136 contact the hemostatic device deployed at the treatment site. Protrusions 136 may create a spacing (e.g., a vertical space) between the hemostatic device and openings 138, and facilitate the distribution of the adhesive over the larger surface area of the hemostatic device.

The adhesive contained in cavity 128 may be a liquid adhesive or a semi-liquid adhesive that is capable of flowing out of assembly 102. The adhesive may be any type of adhesive that is absorbable by the hemostatic device deployed at the treatment site and has a property of adhesion between the hemostatic device and tissue at the treatment site. In these aspects, the adhesive may bind the hemostatic device to the tissue. Cavity 128 may be pre-filled with the adhesive during a manufacturing of assembly 102. Additionally or alternatively, cavity 128 may be filled by the operator of the medical delivery device 100 (or the operator's assistant) prior to assembly 102 being mounted onto medical device 106 during the treatment procedure. For example, a syringe or other similar instrument may be used to transfer the adhesive from a separate storage container to cavity 128 via one of openings 138.

Inner sleeve 108 may be a rigid, hollow cylindrical component similar to outer sleeve 110. In some examples, inner sleeve 108 may be comprised of plastic or other biocompatible material. Inner sleeve 108 may include a flange 112 at a proximal end of inner sleeve 108. Flange 112 may include one or more through holes 114 for receiving actuators 116, as described in detail below. Inner sleeve 108 may also include a step 146 (FIGS. 1B and 1C). Step 146 may be configured to receive a distal tip 148 of medical device 106 to mount assembly 102 to medical device 106. Step 146 may be sized such that inner sleeve 108 is tightly fitted on distal tip 148.

Medical device 106 may be an endoscope or other type of scope, such as a bronchoscope, ureteroscope, duodenoscope, gastroscope, endoscopic ultrasonography ("EUS") scope, colonoscope, laparoscope, arthroscope, cystoscope, aspiration scope, sheath, or catheter. The configuration of assembly 102 prevents obstruction of components at distal tip 148 of medical device 106 when assembly 102 is mounted to medical device 106, and thus the components may operate per usual. As shown in FIG. 2B, exemplary components at distal tip 148 may include distal openings 240 of one or more working channels and/or an imaging system, including one or more illumination devices 242 and/or one or more visualization devices 244 (FIG. 2B). The working channels be configured to supply fluid, apply suction, and/or deliver instruments to the treatment site via the distal openings 240. Illumination devices 242 (e.g., one or more LEDs, optical fibers, and/or other illuminators) of the imaging system may be configured to illuminate areas of the patient's body during the procedure to, e.g., facilitate imaging. Visualization devices 244 (e.g., one or more cameras, one or more image sensors, endoscopic viewing elements, optical assemblies including one or more image sensors and one or more lenses, etc.) of the imaging system may be configured to capture images during the treatment procedure.

Returning to FIGS. 1A-1C, actuators 116 may include wires. Additionally or alternatively, actuators 116 may include cables, threads, or other similar structures. A distal end 117 of actuators 116 may be connected to the proximal end of outer sleeve 110. For example, distal end 117 may be connected to slots 118 at the proximal end of outer sleeve 110. In some examples, distal end 117 may include a loop, hook, ring, or other similar configuration such that actuators 116 are secured to outer sleeve 110 via slots 118, e.g., during manufacturing of assembly 102. Actuators 116 may extend proximally from outer sleeve 110 to handle 104 via through holes 114 of flange 112. At least a portion of each of actuators 116 may be enclosed within a corresponding one of outer tubes 120.

Outer tubes 120 may extend from flange 112 to handle 104. For example, outer tubes 120 may contact a proximal surface of flange 112 at a location surrounding through holes 114. In some examples, outer tubes 120 may be fixedly coupled to the proximal surface of flange 112. Outer tubes 120 may also receive actuators 116 that are extended proximally to handle 104 via through holes 114. A diameter of outer tubes 120 may be larger than a diameter of through holes 114 to prevent outer tubes 120 from extending distally past the proximal surface of flange 112. Such positioning of outer tubes 120 enables outer tubes 120 to apply and maintain pressure distally on flange 112 as actuators 116 are actuated (as described in detail below) to prevent medical device 106 from bending. Outer tubes 120, and actuators 116 enclosed therein, may extend proximally from flange 112 to handle 104 along an exterior (e.g., a radial exterior) of medical device 106 (e.g., to a proximal end of medical device 106). In some examples, a proximal portion of outer tubes 120 having actuators 116 enclosed therein may be further enclosed within a conduit 121 that connects to handle 104 to, e.g., prevent outer tubes 120 from inadvertently intertwining or tangling prior to being received by handle 104. Additionally or alternatively, at least a portion of the radial exterior of medical device 106 may include one or more grooves or channels to movably receive portions of outer tubes 120 having actuators 116 enclosed therein.

A proximal end of each actuator 116 may be connected to an actuation mechanism 122 (FIG. 1A) housed on and/or within handle 104 (e.g., a proximal portion of handle 104). Actuation mechanism 122 may be actuated by the operator of medical delivery device 100 to cause actuators 116 to move inner sleeve 108 and/or outer sleeve 110 relative to the other. An exemplary actuation mechanism 122 may include a lever mechanism, a sliding mechanism, a rotating mechanism, a pushing mechanism, a pulling mechanism, or the like. In some examples, actuation mechanism 122 may include multiple actuation components, as described in detail below with reference to FIGS. 2A-2B and FIG. 3.

Inner sleeve 108 and outer sleeve 110 may contact one another at various contact points. Assembly 102 may include the gaskets, such as first gasket 124 and second gasket 140, at one or more of the contact points to, e.g., prevent leakage or inadvertent flow of adhesive from cavity 128. The gaskets may be flexible components comprised of biocompatible material, such as silicon rubber, thermoplastic elastomer, or the like.

As shown in FIGS. 1B and 1C, first gasket 124 may be positioned at a distal contact point 130 of inner sleeve 108 and outer sleeve 110. As shown, first gasket 124 may be generally shaped as a substantially circular cap positioned over distal tip of 132 of outer sleeve 110. At a distal end of outer sleeve 110, a portion of outer sleeve 110 may bend back proximally to form an interior portion of outer sleeve 110. A proximal end of first gasket 124 may conform around the interior portion of outer sleeve 110. First gasket 124 may then extend distally to distal tip 132 of outer sleeve 110. However, in other examples, first gasket 124 may be shaped in any other suitable manner.

A distal end of first gasket 124 may include a plurality of flaps 134. Each of flaps 134 may be positioned between protrusions 136 at distal tip 132 of outer sleeve 110. Flaps 134 may be configured to cover, close, and/or seal openings 138 at distal tip 132 of outer sleeve 110. Accordingly, flaps 134 may help to prevent leakage or inadvertent flow of the adhesive from openings 138 when assembly 102 is in the first configuration (e.g., prior to movement of inner sleeve 108 and/or outer sleeve 110 relative to the other). For example, inadvertent delivery of the adhesive may be prevented and thus inadvertent contact of the adhesive with bodily fluids during delivery to the treatment site, etc. When inner sleeve 108 and/or outer sleeve 110 are moved relative to the other to transition to the second configuration for adhesive delivery, the volume of space within cavity 128 decreases, causing the adhesive contained therein to become increasingly pressurized. The pressurized adhesive may force flaps 134 to open distally to allow the adhesive to flow distally from cavity 128 via openings 138. The above-described spacing (e.g., a vertical space) from the hemostatic device created by protrusions 136 may enable flaps 134 to open distally within the spacing to help facilitate the flow and/or distribution of the adhesive.

As shown in FIG. 1B, second gasket 140 may be positioned at a proximal contact point 142 of inner sleeve 108 and outer sleeve 110. As shown, second gasket 140 may be generally shaped as a ring with a circular cross section (e.g., an O-ring). However, in other examples, second gasket 140 may be shaped in any other suitable manner, for example, having a triangular, ovular, square, rectangular, etc. cross-section. Inner sleeve 108 may include a groove 144, and second gasket 140 may be positioned within groove 144. As shown, groove 144 may be a concave groove. Second gasket 140 may be sized such that second gasket 140 is compressed once positioned within groove 144.

Although various components of assembly 102 are discussed as being generally cylindrical in shape, this disclosure is not so limited. In other examples, components of assembly 102 may be ovular, triangular, square, rectangular, or pentagonal, among other shapes.

To provide a non-limiting, illustrative method of use of medical delivery device 100, during an exemplary treatment procedure, assembly 102 may be mounted to medical device 106. Medical device 106 may be inserted into a body lumen of the patient and navigated toward a treatment site. In one example, the treatment site may be a bleeding site in the stomach or duodenum, and medical device 106 may be inserted into the patient's mouth and navigated through the esophagus into the stomach and/or through the stomach and into the duodenum to the treatment site. The imaging system of medical device 106 (e.g., illumination devices 242 and/or visualization devices 244) may provide visual guidance as medical device 106 is navigated to the treatment site.

In one example, a hemostatic device (e.g., a patch or a mesh) may have been previously delivered to the treatment site, and deployed to cover the treatment site. For example, prior to mounting assembly 102 to medical device 106, medical device 106 (or another medical device similar to medical device 106) may have been inserted into the body lumen of the patient to deliver the hemostatic device, e.g., via a working channel of medical device 106. In some examples, a hemostatic device delivery system may be used in conjunction with medical device 106 to deploy the hemostatic device at the treatment site. For example, the hemostatic device delivery system may be delivered through and extend distally from distal opening 240 of working channel of medical device 106 that is positioned at the treatment site to deploy the hemostatic device. Once the hemostatic device has been deployed, medical device 106 may have been removed to enable assembly 102 to be mounted to medical device 106. Alternatively, if the other medical device similar to medical device 106 was used for hemostatic device delivery and deployment, the other medical device may be removed and replaced with medical device 106 having assembly 102 mounted thereto.

In another example, medical device 106 having assembly 102 mounted thereto, may be configured to facilitate delivery and deployment of the hemostatic device, e.g., via the working channel of medical device 106, just prior to the delivery of the adhesive via assembly 102. In such examples, only one insertion (and removal) of medical device 106 from the body lumen of the patient may be necessary to deliver both the hemostatic device and adhesive, which may help to decrease an overall procedure time. Additionally, assembly 102 may include one or more markings or other visual features to help guide the operator to mount assembly 102 to medical device 106. The one or more markings or other visual features on the assembly may help the operator to position assembly 102 in a manner that helps to ensure distal opening 240 of the working channel of medical device 106 remains unobstructed. In a further example, an end cap and/or a tube through which the hemostatic device may be delivered may be positioned around or adjacent to assembly 102 and/or medical device 106.

For delivery of the adhesive, a distalmost end of protrusions 136 at distal tip 132 of assembly 102 may be placed in contact with or adjacent to the hemostatic device. The operator may then actuate (e.g., by sliding, rotating, pushing, and//or pulling) actuation mechanism 122 on handle 104 to cause delivery of the adhesive. For example, actuation mechanism 122 may apply tension on the actuators 116, while outer tubes 120 maintain a constant pressure against assembly 102, to cause movement of inner sleeve 108 and/or outer sleeve 110 relative to the other to transition from the first configuration to the second configuration. As inner sleeve 108 and/or outer sleeve 110 are moved, the volume of space within cavity 128 decreases, causing the adhesive contained therein to become increasingly pressurized. The application of the pressurized adhesive against an interior surface of flaps 134 may force flaps 134 to open and allow the adhesive to be delivered via the openings 138 in a distributed manner over the area of the treatment site to help secure the hemostatic device to the treatment site to, e.g., control bleeding.

In one embodiment, actuation mechanism 122 may create tension in the actuators 116 to cause outer sleeve 110 to be pulled proximally toward handle 104 while inner sleeve 108 remains substantially stationary. In such examples, as outer sleeve 110 is being pulled proximally, the operator may need to correspondingly move assembly 102 (e.g., by moving medical device 106) distally such that the distalmost end of protrusions 136 remain in contact with or adjacent to the hemostatic device. In some examples, the distal movement of medical device 106 while outer sleeve 110 is being pulled proximally toward handle 104 may also cause inner sleeve 108 to be moved distally while outer sleeve 110 is moving proximally. In another embodiment, actuation mechanism 122 may create tension in the actuators 116 to cause inner sleeve 108 to be pushed distally away from handle 104 while outer sleeve 110 remains substantially stationary.

While the specific application of medical delivery device 100 described herein is associated with a treatment procedure in which adhesive is distributed to a hemostatic device deployed at a bleeding site within the GI tract, medical delivery device 100 is not limited to this application. For example, medical delivery device 100 may be used for any procedure in which a liquid or semi-liquid substance is to be delivered in a distributed manner to a site within a patient's body this is accessible via a medical device, such as medical device 106.

Figures 2A, 2B:
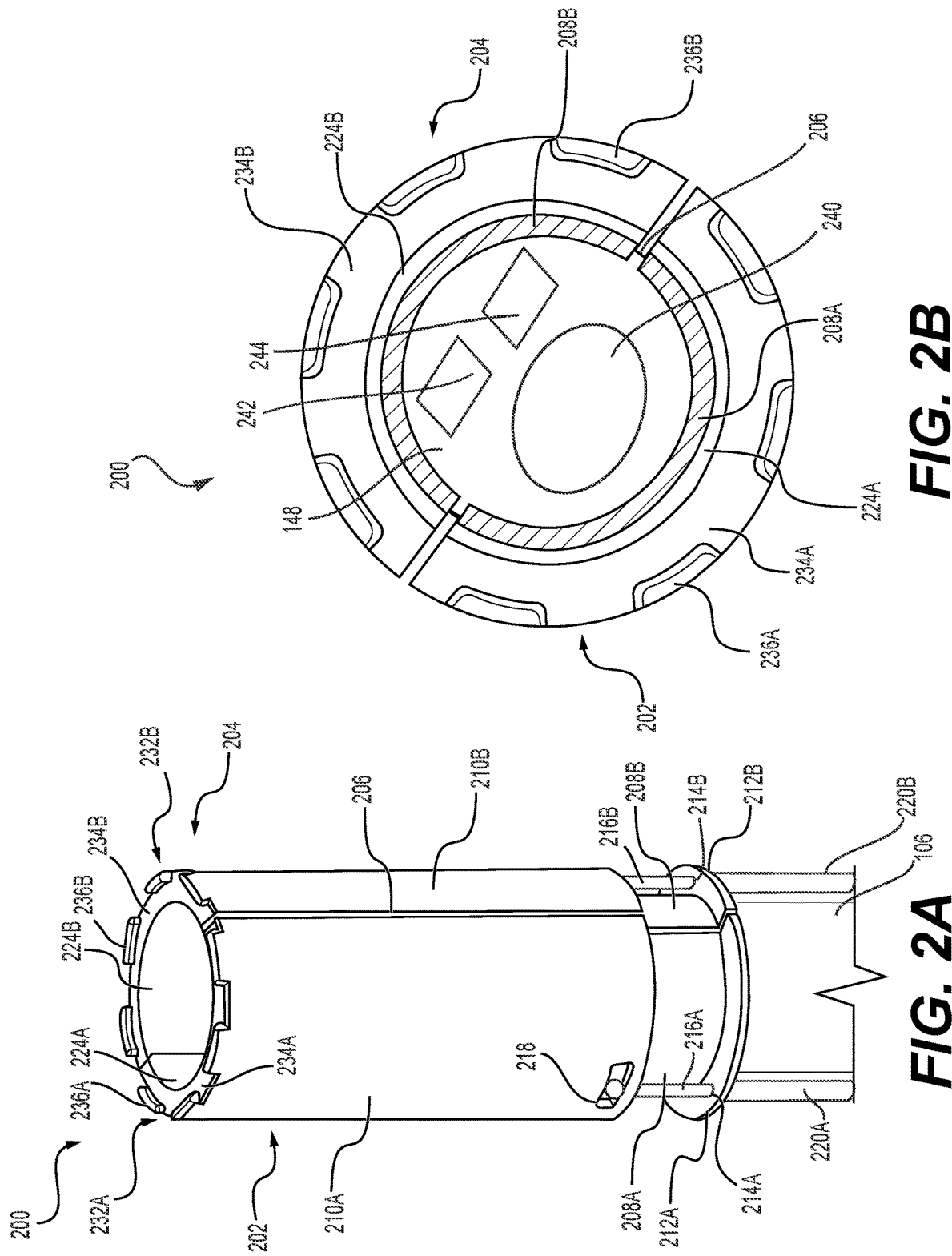
FIGS. 2A-2B depict various views of a second assembly configuration.

FIGS. 2A and 2B depict side and top view perspectives of a second assembly configuration, respectively. For example, instead of assembly 102, medical delivery device 100 shown in FIG. 1A may include a two-part assembly 200, hereinafter assembly 200. Assembly 200 may be removably mounted to medical device 106 and connected to handle 104 (FIG. 1A). Referring concurrently to FIGS. 2A and 2B, assembly 200 may include a first assembly 202 for delivering a first adhesive component, and assembly 200 may also include a second assembly 204 for delivering a second adhesive component. The second adhesive component may be mixed with the first adhesive component at the treatment site. The first and second adhesive components may be liquid or semi-liquid substances. In some examples, the first and second adhesive components may include a resin and a hardener that mix at the treatment site, for example, to form a polymeric adhesive, which may have high adhesion and/or holding strength.

Each of first assembly 202 and second assembly 204 may include the same or similar components as assembly 102 described with reference to FIGS. 1A-1C However, a shape of the components may be different. For example, instead of components generally having a cylindrical shape, components of first assembly 202 and second assembly 204 may generally have a semi-cylindrical shape. In other examples, first assembly 202 and second assembly 204 may be shaped in any other suitable manner.

Inner sleeve 208A, 208B and outer sleeve 210A, 210B of each of first assembly 202 and second assembly 204 may be rigid, hollow semi-cylindrical components that are movably coupled to one another and form cavities, for example, similar to cavity 128 (shown in FIGS. 1B and 1C). Cavity (not shown) of first assembly 202 may be configured to hold the first adhesive component, and cavity (not shown) of second assembly 204 may be configured to hold the second adhesive component. Distal tip 232A, 232B of outer sleeve 210A, 210B of each of first assembly 202 and second assembly 204 may include openings (not shown), similar to openings 138 shown in FIG. 1C, that are spaced apart along the circumference of distal tip 232A, 232B via which the first and second adhesive components may be respectively delivered. Distal tip 232A, 232B of outer sleeve 210A, 210B of each of first assembly 202 and second assembly 204 may also include protrusions 236A, 236B between each of openings, similar to protrusions 136 shown in FIGS. 1A-1C. Each of first assembly 202 and second assembly 204 may further include a first gasket 224A, 224B and a second gasket (not shown). Each first gasket 224A, 224B may be similar to first gasket 124 shown in FIGS. 1A-1C and include flaps 234A, 234B covering openings of outer sleeve 210A, 210B. The second gasket may be similar to second gasket 140 shown in FIG. 1B.

At least one actuator 216A, 216B may be attached to each outer sleeve 210A, 210B of first assembly 202 and second assembly 204 via slot 218. It is noted that FIG. 2A does not show a slot in outer sleeve 210B of second assembly 204, as the slot is on the rear portion of outer sleeve 210B of second assembly 204 (i.e., into the page). Actuator 216A, 216B may extend proximally to handle 104 (shown in FIG. 1A) via a corresponding through hole 214A, 214B of flange 212A, 212B of inner sleeve 208A, 208B of each of first assembly 202 and second assembly 204. At least a portion of each actuator 216A, 216B may be enclosed in an outer tube 220A, 220B. Actuators 216A, 216B and outer tubes 220A, 220B may be the same or similar to actuators 116 and outer tubes 120, respectively, described above with reference to assembly 102 of FIGS. 1A-1C.

First assembly 202 and second assembly 204 may be connected to one another at a connection 206. For example, assembly 200 may include snapping or locking features to couple at least outer sleeve 210A of first assembly 202 and outer sleeve 210B of second assembly 204 at connection 206 to enable first assembly 202 and second assembly 204 to move mechanically relative to one another (e.g., proximally and/or distally).

In one embodiment, first assembly 202 and second assembly 204 may be operated simultaneously. For example, actuator 216A, 216B attached to outer sleeve 210A, 210B of each of first assembly 202 and second assembly 204 may connect to a same actuation component of actuation mechanism 122 in handle 104 (FIG. 1A). Accordingly, actuation of actuation mechanism 122 by the operator may cause simultaneous movement of inner sleeve 208A, 208B and/or outer sleeve 210A, 210B relative to the other in each of first assembly 202 and second assembly 204. Resultantly, the first and second adhesive components may become pressurized causing respective flaps 234A, 234B of first gasket 224A, 224B at distal tip 232A, 232B of outer sleeve 210A, 210B on each of first assembly 202 and second assembly 204 to open, and allow flow of the first and second adhesive components to the hemostatic device at the treatment site via openings. In this embodiment, either outer sleeves 210A, 210B of first assembly 202 and second assembly 204 may be simultaneously pulled proximally toward handle 104 or inner sleeves 208A, 208B of first assembly 202 and second assembly 204 may be simultaneously pushed distally away from handle 104, as described in more detail above with reference to FIGS. 1A-1C. In some examples, as the first and second adhesive components are flowing from first assembly 202 and second assembly 204, an operator may rotate medical device 106 causing first assembly 202 and second assembly 204 to correspondingly rotate, which may help facilitate the mixing of the first and second adhesive components at the treatment site.

In another embodiment, first assembly 202 and second assembly 204 may be operated independent of one another. Independent operation of first assembly 202 and second assembly 204 may be useful when, based on the properties of one or more of the first and second adhesive components, it is preferable to deliver one adhesive component prior to the other to facilitate a bonding and/or reaction, for example. In such examples, actuation mechanism 122 of handle 104 may include at least two actuation components (not shown). Actuator 216A attached to outer sleeve 210A of first assembly 202 may connect to a first actuation component, while actuator 216B attached to outer sleeve 210B of second assembly 204 may connect to a second actuation component.

Actuation of the first actuation component by the operator may cause movement of inner sleeve 208A and/or outer sleeve 210A relative to the other from the first configuration to the second configuration in first assembly 202 to cause delivery of the first adhesive component, while inner sleeve 208B and outer sleeve 210B of second assembly 204 may remain in the first configuration. Actuation of the second actuation component by the operator may cause movement of inner sleeve 208B and/or outer sleeve 210B relative to the other from the first configuration to the second configuration in second assembly 204 to cause delivery of the second adhesive component. In some examples, delivery of the first and second adhesive components may be performed in an alternating manner. For example, a portion of the first adhesive component may be delivered followed by a portion of second adhesive component, before returning to delivering another portion of the first adhesive component, and so on. In other examples, first assembly 202 and second assembly 204 may be operated independently to nonetheless deliver the first adhesive component and second adhesive component concurrently.

In these aspects, to transition from the first configuration to the second configuration, inner sleeves 208A, 208B of first assembly 202 and second assembly 204 may be independently pushed distally away from handle 104, while outer sleeves 210A, 210B remain stationary. Alternatively, outer sleeves 210A, 210B of first assembly 202 and second assembly 204 may be independently retracted proximally toward handle 104, while inner sleeves 208A, 208B remain stationary.

While first assembly 202 and second assembly 204 are shown and described herein with reference to FIGS. 2A and 2B, assembly 200 may include more than two subassemblies that may be operated together or separately via corresponding actuation component(s) of actuation mechanism 122. Resultantly, more than two adhesive components may be delivered (although more than one subassembly may have the same adhesive component). In some examples, medical delivery device 100 may include labeling on subassemblies, actuators, and/or actuation component(s) of actuation mechanism 122 on handle 104 so the operator may easily know and control which adhesive component is being delivered at a given time.

Figure 3:
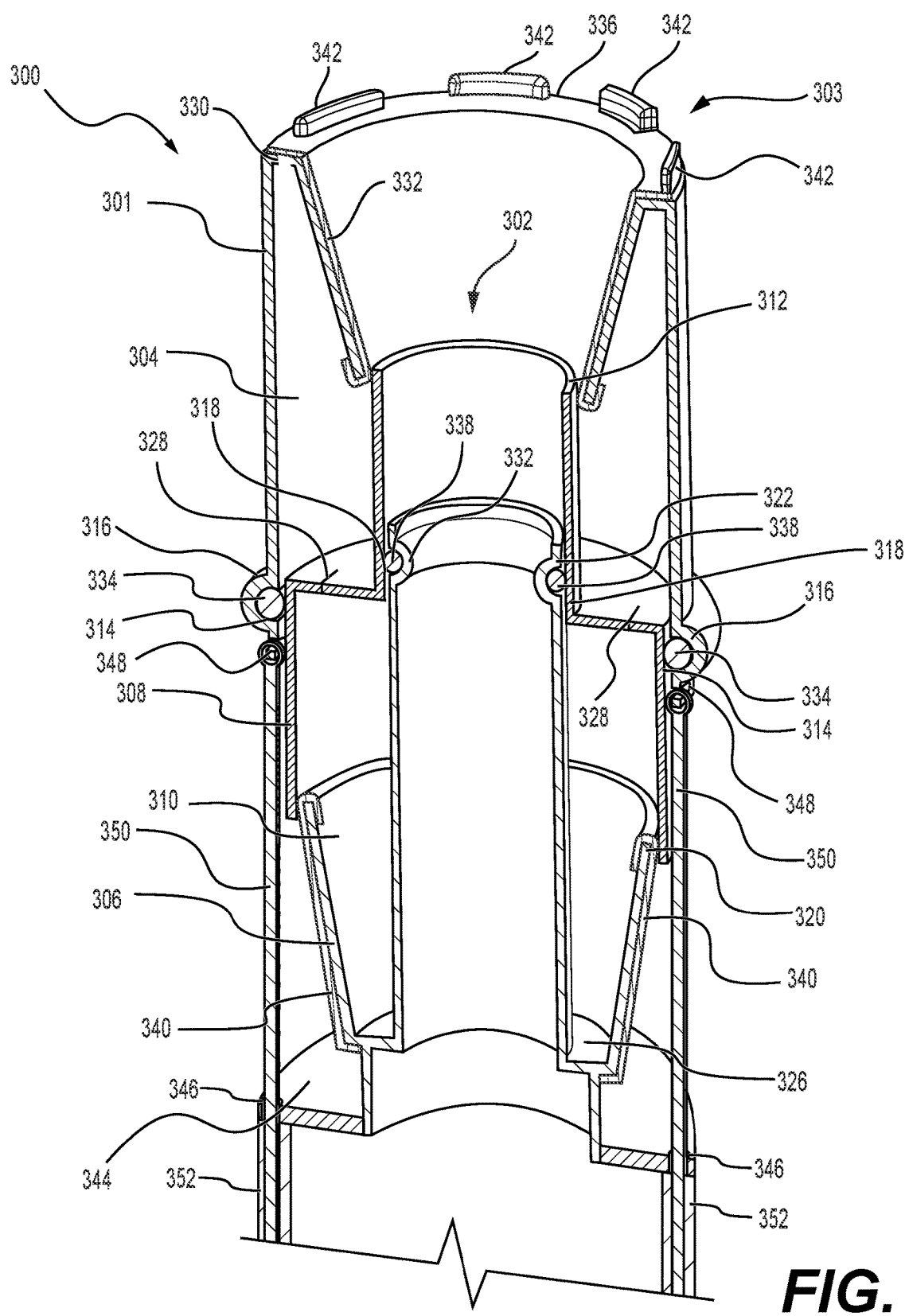
FIG. 3 depicts a cross-sectional view of a third assembly configuration.

FIG. 3 depicts a cross-sectional view of a third assembly configuration. For example, instead of assembly 102, medical delivery device 100 shown in FIG. 1A may include a telescopic two-part assembly 300, hereinafter assembly 300, removably mounted to medical device 106 and connected to handle 104 (FIG. 1A). Assembly 300 may include an outer sleeve 301 movably coupled to a telescoping sleeve 302. A first cavity 304 may be defined by a volume of space between telescoping sleeve 302 and outer sleeve 301. First cavity 304 may be configured to hold a first adhesive component.

Telescoping sleeve 302 may include an inner telescoping sleeve 306 and an outer telescoping sleeve 308 movably coupled to inner telescoping sleeve 306. A second cavity 310 may be defined by a volume of space between inner telescoping sleeve 306 and outer telescoping sleeve 308. Second cavity 310 may be configured to hold a second adhesive component that is to be mixed with the first adhesive component to form the adhesive within first cavity 304 prior to delivery of the adhesive from assembly 300. The first and second adhesive components may be liquid or semi-liquid substances. The second adhesive component may be configured to flow from second cavity 310 to first cavity 304 via valves 328 of outer telescoping sleeve 308 as inner telescoping sleeve 306 is moved relative to outer telescoping sleeve 308 from a first configuration to a second configuration. In some examples, based on properties of the first and/or second adhesive components, the first and second adhesive components may only be mixed a predefined amount of time prior to delivery (e.g., preventing pre-mixing and use of assembly 102). Accordingly, assembly 300 may provide more controlled timing for the components to bond, react, and/or harden, as well as lessen the risk of clogs, or the like.

Assembly 300 may include a plurality of gaskets. For example, assembly 300 may include a first gasket 332 at a distal contact point 312 and a second gasket 334 at a proximal contact point 314 between outer sleeve 301 and outer telescoping sleeve 308 to prevent leakage or inadvertent flow of the first adhesive component (and/or adhesive once second adhesive component is mixed with the first adhesive component) from first cavity 304. First gasket 332 may be similar to first gasket 124 described with reference to FIGS. 1A-1C. For example, first gasket 332 may be generally shaped as a substantially circular cap positioned over a distal tip 303 of outer sleeve 301 that includes flaps 336 configured to cover, close, and/or seal openings 330 at distal tip 303 of outer sleeve 301. Second gasket 334 may be similar to second gasket 140 described with reference to FIGS. 1A-1C. Second gasket 334 may be positioned in a groove 316 of outer sleeve 301 at proximal contact point 314. As shown, groove 316 may be a convex groove. In some examples, outer sleeve 301 may include a bump that extends radially outward to form groove 316.

Assembly 300 may also include a third gasket 338 at a distal contact point 318 and a fourth gasket 340 at a proximal contact point 320 between outer telescoping sleeve 308 and inner telescoping sleeve 306, which may help to prevent leakage or inadvertent flow of the second adhesive component from second cavity 310. Third gasket 338 may be similar to second gasket 140 described with reference to FIGS. 1A-1C. Third gasket 338 may be positioned in a groove 322 of inner telescoping sleeve 306 at distal contact point 318. As shown, groove 322 may be a concave groove. In some examples, inner telescoping sleeve 306 may include a bump that extends radially inward to form groove 322. Fourth gasket 340 may be generally shaped as a substantially circular cap that is positioned over the proximal end of outer telescoping sleeve 308.

Inner telescoping sleeve 306 may include a step 326, similar to step 146, that may be configured to receive medical device 106 to mount assembly 300 to medical device 106. Additionally, inner telescoping sleeve 306 may include a flange 344 with through holes 346, similar to flange 112 with through holes 114 in assembly 102. Actuators 350, similar to actuators 116, may attach to outer sleeve 301 (e.g., via a slot 348 of outer sleeve 301 similar to slot 118 in assembly 102) and extend proximally via through holes 346 of flange 344 toward handle 104. At least a portion of actuators 350 may be enclosed by outer tubes 352, similar to outer tubes 120. Actuators 350 may connect to the actuation mechanism 122 in handle 104.

When medical device 106 with mounted assembly 300 is navigated to a treatment site and positioned relative to a hemostatic device deployed to cover an area of the treatment site, actuation mechanism 122 of handle may be actuated. Initially, tension created by actuation mechanism 122 on actuators 350 may cause inner telescoping sleeve 306 to be pushed or otherwise urged distally away from handle 104, as outer telescoping sleeve 308 remains stationary along with outer sleeve 301, to cause the second adhesive component to flow from second cavity 310 to first cavity 304 via valves 328. The first and second adhesive components may mix within first cavity 304 to form the adhesive. Once inner telescoping sleeve 306 is moved relative to outer telescoping sleeve 308 from the first to second configuration, tension created by actuation mechanism 122 on actuators 350 may further cause an entirety of telescoping sleeve 302 to then be pushed or otherwise urged distally away from handle 104, as outer sleeve 301 remains stationary. In other examples, outer sleeve 301 may be retracted or pulled proximally toward handle 104, as telescoping sleeve 302 remains stationary. In further examples, outer sleeve 301 may be retracted proximally and telescoping sleeve 302 may be pushed distally alternatingly or contemporaneously relative to one another. In any of these examples, adhesive may resultantly flow from first cavity 304 via openings 330 at distal tip 303 of outer sleeve 301 in a distributed manner over the area of the treatment site on which the hemostatic device is deployed.

Alternatively, assembly 300 may be configured such that tension created by actuation mechanism 122 on actuators 350 may initially cause outer telescoping sleeve 308 to be retracted or pulled proximally toward handle 104, as inner telescoping sleeve 306 remains stationary along with outer sleeve 301. Then, once outer telescoping sleeve 308 is moved relative to inner telescoping sleeve 306, an entirety of telescoping sleeve 302 may then be pushed or otherwise urged distally away from handle 104, as outer sleeve 301 remains stationary. In other examples, once outer telescoping sleeve 308 is moved relative to inner telescoping sleeve 306, outer sleeve 301 may be retracted or pulled proximally toward handle 104, as telescoping sleeve 302 remains stationary. In further examples, outer sleeve 301 may be retracted proximally and outer telescoping sleeve 308 may be pushed distally alternatingly or contemporaneously relative to one another.

Distal tip 303 of outer sleeve 301 may also include protrusions 342 between each of openings 330. Protrusions 342 may be similar to protrusions 136 between openings 138 at distal tip 132 of outer sleeve 110 in assembly 102. Protrusions 342 may further facilitate the distribution of the adhesive, as well as provide a spacing (e.g., a vertical space) between the openings 330 and the hemostatic device (e.g., to enable flaps 336 of the first gasket 332 to open).

In some examples, actuation mechanism 122 may be configured to provide the operator with a tactile indicator when telescoping sleeve 306 has moved relative to outer telescoping sleeve 308 from the first to second configuration. In other examples, the actuation mechanism 122 may include two actuation components. A first actuation component may be actuated to cause the movement of inner telescoping sleeve 306 relative to outer telescoping sleeve 308. A second actuation component may be actuated to cause the movement of the entirety of telescoping sleeve 302 relative to outer sleeve 301. The tactile indicator and/or inclusion of two actuation components may be helpful in scenarios where the first and second adhesive component may need to be mixed for a predefined period of time within first cavity 304 prior to delivering the adhesive to, for example, allow for desired bonding and/or reactions to take place.

While outer sleeve 301 and telescoping sleeve 302 are shown and described herein with reference to FIG. 3, assembly 300 may include more than one telescoping sleeve. Resultantly, more than two adhesive components may be mixed prior to delivery (although more than one cavity formed by additional telescoping sleeve(s) may have the same adhesive component).

While principles of this disclosure are described herein with the reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

We claim:

1. An assembly of a medical delivery device, the assembly comprising:
   an inner sleeve including a flange at a proximal end, the flange including one or more through holes;
   an outer sleeve movably coupled to the inner sleeve, a distal tip of the outer sleeve including a plurality of openings for delivering an adhesive to a treatment site;
   a cavity formed between the inner sleeve and the outer sleeve and configured to hold the adhesive prior to the delivering; and
   one or more actuators connected to a proximal end of the outer sleeve and extended via the one or more through holes to a handle of the medical delivery device, wherein actuation of the one or more actuators moves one of the inner sleeve or the outer sleeve relative to the other to cause the delivering of the adhesive.

2. The assembly of claim 1, wherein the distal tip of the outer sleeve further comprises a plurality of distally extending protrusions positioned between at least some of the plurality of openings.

3. The assembly of claim 1, further comprising:
   a first gasket positioned at a distal contact point of the inner sleeve and the outer sleeve that extends to the distal tip of the outer sleeve.

4. The assembly of claim 3, wherein the first gasket includes a plurality of flaps corresponding to and covering the plurality of openings at the distal tip.

5. The assembly of claim 1, wherein the inner sleeve includes a groove, and the assembly further comprises:
   a second gasket positioned at a proximal contact point of the inner sleeve and the outer sleeve within the groove.

6. The assembly of claim 1, further comprising:
   one or more outer tubes coupled to the flange and enclosing the one or more actuators from a proximal surface of the flange to the handle.

7. The assembly of claim 1, wherein the assembly is a first assembly of a two-part assembly of the medical delivery device for delivering a first component of the adhesive, and wherein the first assembly is connected to a second assembly of the two-part assembly that is for delivering a second component of the adhesive to be mixed with the first component at the treatment site.

8. The assembly of claim 7, wherein the first assembly is coupled to a first actuation component of an actuation mechanism disposed on or within the handle, the second assembly is coupled to a second actuation component of the actuation mechanism, and the first actuation component and the second actuation component are independently actuable to cause independent operation of the first assembly and the second assembly.

9. The assembly of claim 1, wherein the inner sleeve is a telescoping sleeve, and wherein the cavity formed between the inner sleeve and the outer sleeve is a first cavity configured to hold a first component of the adhesive.

10. The assembly of claim 9, wherein the telescoping sleeve comprises an inner telescoping sleeve, and an outer telescoping sleeve movably coupled to the inner telescoping sleeve, and wherein the assembly further comprises:
    a second cavity formed between the inner telescoping sleeve and the outer telescoping sleeve and configured to hold a second component of the adhesive to be mixed with the first component prior to the delivering of the adhesive to the treatment site.

11. The assembly of claim 10, wherein the outer telescoping sleeve includes one or more valves to allow for flow of the second component of the adhesive from the second cavity to the first cavity.

12. The assembly of claim 10, further comprising:
    a first gasket positioned at a distal contact point of the outer telescoping sleeve and the outer sleeve;
    a second gasket positioned at a proximal contact point of the outer telescoping sleeve and the outer sleeve;
    a third gasket positioned at a distal contact point of the inner telescoping sleeve and the outer telescoping sleeve; and
    a fourth gasket positioned at a proximal contact point of the inner telescoping sleeve and the outer telescoping sleeve.

13. The assembly of claim 1, wherein the inner sleeve includes a step configured to receive a distal tip of a medical device to mount the assembly to the medical device.

14. The assembly of claim 13, wherein a configuration of the assembly prevents obstruction of components at the distal tip of the medical device when the assembly is mounted to the medical device, the components including at least one of distal openings of one or more working channels, one or more illumination devices, or visualization devices.

15. The assembly of claim 1, wherein the proximal end of the outer sleeve includes one or more slots, and wherein the one or more actuators are coupled to the proximal end of the outer sleeve via the one or more slots.

16. An assembly of a medical delivery device, comprising:
    an inner sleeve including a flange at a proximal end, the flange including one or more through holes;
    an outer sleeve movably coupled to the inner sleeve, a distal tip of the outer sleeve including a plurality of openings for delivering an adhesive to a treatment site;
    a cavity formed between the inner sleeve and the outer sleeve and configured to hold the adhesive prior to the delivering;
    a gasket positioned at a distal contact point of the inner sleeve and the outer sleeve that extends to the distal tip of the outer sleeve and includes a plurality of flaps corresponding to and covering the plurality of openings at the distal tip; and one or more actuators connected to a proximal end of the outer sleeve and extended via the one or more through holes to a handle of the medical delivery device, wherein actuation of the one or more actuators moves one of the inner sleeve or the outer sleeve relative to the other to pressurize the adhesive in the cavity causing the plurality of flaps to be forced open and the adhesive to be delivered via the plurality of openings.

17. The assembly of claim 16, wherein the distal tip of the outer sleeve further comprises a plurality of distally extending protrusions positioned between at least some of the plurality of openings.

18. The assembly of claim 16, further comprising:
one or more outer tubes coupled to the flange and enclosing the one or more actuators from a proximal surface of the flange to the handle.

19. A medical delivery device, comprising:
a handle including one or more actuation mechanisms; and
one or more assemblies mountable to a medical device, each of the one or more assemblies including:
an inner sleeve including a flange at a proximal end, the flange including one or more through holes;
an outer sleeve movably coupled to the inner sleeve, a distal tip of the outer sleeve including a plurality of openings for delivering adhesive to a treatment site;
a cavity formed between the inner sleeve and the outer sleeve and configured to hold the adhesive prior to the delivering; and
one or more actuators connected to a proximal end of the outer sleeve and extended via the one or more through holes to the handle of the medical delivery device, wherein actuation of the one or more actuators via the one or more actuation mechanisms moves one of the inner sleeve or the outer sleeve relative to the other to cause the delivering of the adhesive.

20. The medical delivery device of claim 19, wherein the one or more assemblies include a first assembly for delivering a first component of the adhesive and a second assembly for delivering a second component of the adhesive to be mixed with the first component at the treatment site.

* * * * *